April 17, 1962  W. SCHAELCHLIN ET AL  3,030,565
DRIVE AND METHOD OF OPERATING DRIVE
Filed Feb. 17, 1959
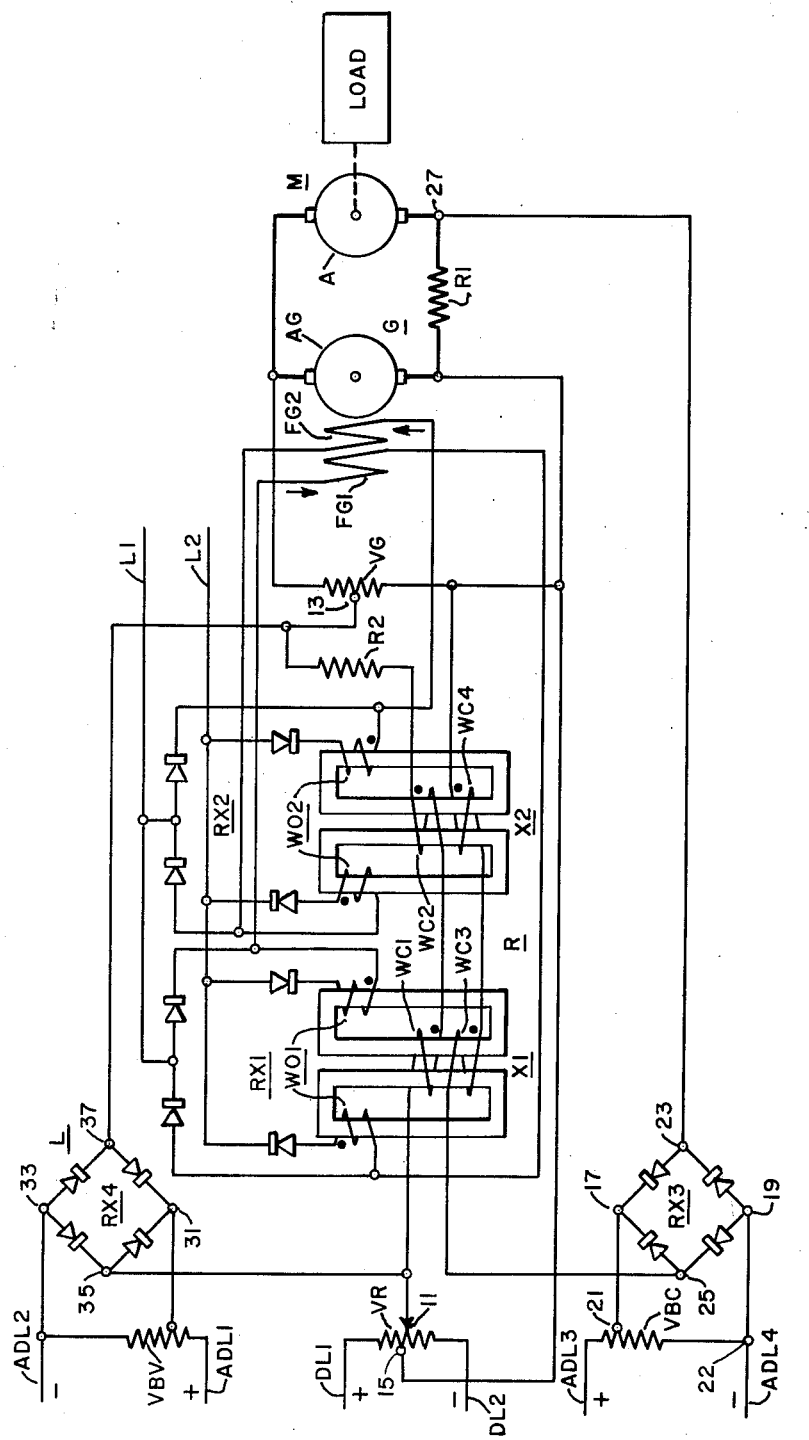

United States Patent Office 3,030,565
Patented Apr. 17, 1962

3,030,565
DRIVE AND METHOD OF OPERATING DRIVE
Walter Schaelchlin, San Francisco, Calif., and Charlton H. Storey, Jr., Buffalo, N.Y., assignors to Westinghouse Electric Corporation, East Pittsburgh, Pa., a corporation of Pennsylvania
Filed Feb. 17, 1959, Ser. No. 793,931
5 Claims. (Cl. 318—143)

This invention relates to the motor art and has particular relationship to industrial drives, the cycle of operation of which is relatively short in duration and which are frequently reversed.

The prior art involving such drives is typified by Storey et al., Patent 2,743,404. The drive disclosed in this patent operates a lumber saw and is of the adjustable voltage type. This drive includes a D.C. motor energized from a generator, the output voltage of which is adjustable. When such drives act on high-inertia loads as actually illustrated by Storey, this factor is often dominant in determining machine size. Maximum economy requires that the machine selected be worked at its maximum capabilities while the speed of the drive is being changed. It is, thus, desirable that the D.C. drive motor deliver maximum torque, requiring in the armature loop the maximum current which can safely be commutated. Such drives generally employ voltage regulators, which permit "forcing" of the generator field for rapid changes, and as disclosed by Storey customarily incorporate some manner of "current-limiting" to over-ride the voltage regulator when the maximum safe current has been reached. The Storey drive has proved highly successful in certain application but it has been discovered that its operation can be materially improved.

In drives such as Storey's the regulator is controlled by voltage matching; that is, by comparing the voltage of the generator with a reference voltage set so that the torque of the drive will have the desired magnitude and direction and impressing the algebraic difference on the regulator as an error. The error causes the regulator to change the drive energizing voltage so as to reduce the error to zero.

In drives for loads which have short-cycle times and require frequent reversals, two principal situations are to be considered: first, starting from zero voltage to set the drive for rated voltage and load in either direction; second, reversing at any time while the drive is operating at rated voltage and load in one direction to set the drive at rated voltage and load in the opposite direction. In the first situation acceleration occurs and the error voltage is large compared to the error voltage under steady state conditions. The relationship depends on the extent to which the drive is being forced and is higher the more abrupt the forcing. In the second situation the drive is plugged and then reversed or plugged to stop but in either event the error voltage is twice the corresponding error voltage in the first situation.

The error voltage in prior art apparatus is then established by the conditions arising during plugging; that is, the swing in the reference voltage must be limited to a magnitude which, if applied during plugging, would not cause the motor or generator to exceed its commutation rating. The corresponding load current during acceleration and deceleration is similarly limited.

It is then an object of this invention to provide a drive particularly for loads having short-cycle time and requiring frequent reversal, but having other applications, in the operation of which the use of peak rated currents during acceleration, deceleration as well as plugging shall be feasible and it is another object of this invention to provide a method of operating such a drive.

In accordance with this invention, the error voltage is permitted to rise to a maximum corresponding to the rated current of the motor for acceleration, deceleration and plugging, but the excess error voltage is suppressed by limiting means. Specifically, a shunt circuit is provided around the component of the regulator which control the operation of the regulator. This shunt circuit by-passes any excess in the error voltage above a predetermined voltage corresponding to safe operation.

Thus the maximum desired signal on the voltage regulator is obtained, but the undesired excess is bypassed and the current limit works against an adjustable maximum voltage error which may be substantially less quantitatively than in prior art drives. It is also independent of whether the drive is being accelerated, decelerated or plugged. The current limit characteristic permits the use of maximum safe current for any type of speed change introduced into the system by varying the reference voltage.

The signal required in the voltage control field is also a function of the voltage regulator gain. Where relatively high gain is employed, the signal may be more than that required to obtain the desired field forcing, i.e. some element in the system saturates. Where this is the case with prior art drives, higher current limit gains are required, yielding a system more difficult to stabilize dynamically. With voltage limit applied, since there is a continuous recalibration of the control signal during speed changes, high steady-state gains can be obtained without excessive forcing resulting, thus making the current limit far more effective and easier to handle.

The advantages offered by this combination of voltage error limit and current limit over the conventional current limit scheme disclosed by Storey are: (1) The use of the same peak currents for acceleration or for plugging; and (2) current limit gains can be lower resulting in systems less critical from the stability standpoint.

The novel features considered characteristic of this invention are disclosed generally above. The invention itself both as to its organization and as to its method of operation, together with additional objects and advantages thereof, will be understood from the following description of a specific embodiment, taken in connection with the accompanying drawing, in which the single FIGURE is a circuit diagram of a preferred embodiment of this invention.

The apparatus shown in the drawing includes a motor M, a generator G, a regulator R, and a limiting unit L. The motor M may be of the direct-current shunt type, as in the Storey patent. It may have a shunt field winding (not shown), as in Storey and an armature A. The motor M drives a load which may be a lumber saw as in Storey or like apparatus.

The generator G includes an armature AG and shunt field windings FG1 and FG2. The generator G may include other shunt and series windings as in Storey. The armature AG is connected across the armature A through a resistor R1, the drop across which measures the load on the motor M. The direction of rotation of the motor M is determined by the polarity of the fields FG1 and FG2. Current through field FG1 produces an output potential of one polarity across the generator G and current through field FG2 produces a potential of the opposite polarity across generator G.

The regulator R is supplied from alternating current conductors L1 and L2 and includes a pair of saturable reactor units X1 and X2. Each unit has output windings WO1 and WO2, respectively, and two sets of control windings WC1 and WC2 and WC3 and WC4, respectively. The winding FG1 is supplied from the conductors L1, L2 through the windings WO1 and through the usual self-saturating rectifier unit RX1; the winding FG2 is similarly supplied through WO2 and through rectifier RX2.

The positive currents (or holes) transmitted through FG1 and FG2 are as indicated by the arrows.

The regulator R also includes a tapped resistor VG connected across the armature AG for deriving a voltage dependent on (usually proportional to) the output voltage of generator G. In addition, there is a center-tapped variable resistor VR supplied with direct-current potential from conductors DL1 and DL2 for setting the reference voltage corresponding to the desired operation of motor M.

The windings WC1 and WC2 are connected in series with VG and VR through a resistor R2. The circuit extends from the adjusting arm 11 of VR through WC1, WC2, R2, the tap 13 of VG to the center tap 15 of VR. A current of one polarity in this circuit tending to decrease the reactance of WO1 (increase field FG1), increases the reactance of WO2 (decrease field FG2). The current of the opposite polarity increases the reactance of WO1 and decreases the reactance of WO2.

The resistor VR may be set to supply voltage of either polarity depending on the direction in which it is desired that the motor M should rotate. The direction of the current through windings WC1 and WC2 depends on the relative magnitudes and polarities of the potentials across VG and VR. During starting positive current flows in the direction 11, WC1, WC2, R2, 13, if 11 is made electrically positive and in the direction 13, R2, WC2, WC1, 11, if negative. During plugging with 13 positive and 11 negative, positive current flows 13, R2, WC2, WC1, 11, 15, VG; with VG negative and 11 positive, 11, WC1, WC2, R2, 13, 15.

The regulator R also includes a resistor VBC supplied from direct-current conductors ADL3 and ADL4, which impresses a bias corresponding to the maximum current for which the motor M is rated. The resistor VBC is connected in series with windings WC3 and WC4 and R1 in circuit with a rectifier bridge RX3 so that WC3 and WC4 produce ampere turns in the reactors X1 and X2 which are of such polarity as to oppose motor current exceeding the limit. The rectifier bridge RX3 has input terminals 17 and 19 to which the tap 21 and the negative terminal 22 of the resistor VBC are connected. The bridge RX3 also has output terminals 23 and 25 connected in series with R1, WC3 and WC4. When the terminal 27 of R1 electrically nearest the motor M is positive, current can flow in the following path: 27, 23, 17, 21, 22, 19, WC3, WC4, R1, but only if the potential across R1 exceeds the potential across VBC. When the terminal 27 is negative, current can flow as follows: R1, WC4, WC3, 25, 17, 21, 22, 19, 27, but only if the potential across R1 exceeds the potential across VBC. The effect of the current of either polarity is to reduce the rate of change of potential of the generator G.

The limiting unit L includes a rectifier bridge RX4 across the output terminals 31 and 33, of which a part of a resistor VBV is connected. The resistor VBV is supplied with direct current potential from conductors ADL1 and ADL2 and applies to the bridge RX4 a bias such that the bridge is biased so as to block a predetermined potential across its input terminals 35 and 37. The input terminals 35 and 37 of the bridge are connected across resistor R2 and windings WC1 and WC2. The bridge RX4 and resistor VBV absorb any voltage between VG and VR in excess of the bias across VBV and this may be set to correspond to the maximum safe swing of the voltage supplied to windings WC1 and WC2. Thus when 13 is positive and 11 is negative and VBV is exceeded, positive current flows in circuit 13, 37, 31, VBV, 33, 35, 11, 15, VG; when 11 is positive and 13 is negative, positive current flows in circuit 11, 35, 31, VBV, 33, 37, 13, 15. Any excess in the error voltage during plugging is thus absorbed.

While a preferred embodiment of this invention has been disclosed herein, many modifications thereof are feasible. This invention then is not to be restricted except insofar as is necessitated by the spirit of the prior art.

We claim as our invention:

1. Apparatus for controlling the torque of a motor for a drive having characteristics of short cycle timing and frequent reversals comprising a generator connected to said motor for supplying energizing potential to said motor, a regulator connected to said generator for regulating the potential output of said generator, said regulator having potential-responsive control means connected to said generator for setting the potential output of said generator in accordance with an error signal potential impressed on said potential responsive control means, said regulator also having selectively operable means for deriving a first potential corresponding to the desired torque of said motor, means connected to said generator for deriving a second potential dependent on the output potential of said generator, and means connected to said setting means and to said first and second potential deriving means for impressing a third potential substantially equal to the difference between said first and second potentials as an error signal potential on said potential responsive control means, said first potential being set so that said error voltage for each instance of acceleration or deceleration or plugging of said motor is permitted to rise to a maximum corresponding to the rated current for said motor, and means connected to said first and second potential deriving means for limiting said third potential to a predetermined magnitude.

2. A drive having the characteristics of short cycle timing and frequent reversals including a drive motor, a generator connected to said motor to energize said motor, said generator having field winding means, magnetic amplifier means having control winding means and output winding means, means connecting said output winding means to said field winding means, means connected to said generator for deriving a first potential dependent on the output potential of said generator, selectively operable means for supplying a second potential to be set to correspond to the desired operation of said motor, means connected to said deriving means, to said selectively operable means and to said control winding means for impressing on said control winding means an error signal potential dependent on the algebraic difference between said first and second potentials, said selectively operable means being set so that said error signal potential for each change in the operation of said drive may rise to a maximum corresponding to the rated current of said motor, and means connected to said impressing means for limiting said third potential to a predetermined magnitude.

3. A drive having the characteristics of short cycle timing and frequent reversals including a drive motor, a generator connected to said motor to energize said motor, said generator having field winding means, magnetic amplifier means having control winding means and output winding means, means connecting said output winding means to said field winding means, means connected to said generator for deriving a first potential dependent on the output potential of said generator, selectively operable means for supplying a second potential to be set to correspond to the desired operation of said motor, means connected to said deriving means, to said selectively operable means and to said control winding means for impressing on said control winding means a first error signal potential dependent on the algebraic difference between said first and second potentials, said selectively operable means being set so that said error signal potential for each change in the operation of said drive may rise to a maximum corresponding to the rated current of said motor, means for deriving a fourth potential dependent on the current conducted by said motor, means connected to said last-named deriving means and to said control winding means for impressing said fourth potential on said control winding means so that the ampere turns produced by said fourth potential opposes the ampere turns produced by said error signal potential, and means connected to said impressing means for limiting said error signal potential to a predetermined magnitude.

4. A drive having the characteristics of short cycle timing and frequent reversals including a drive motor and means connected to said motor for supplying energizing potential thereto in dependence upon the desired operation of said motor, a regulator connected in regulating relationship to said supplying means and including means connected to said supplying means for deriving a first potential dependent on said energizing potential, selectively operable means for supplying a second potential dependent on the desired energizing potential and means responsive to an error signal potential dependent on the algebraic difference between said first and second potentials for causing said regulator to set said energizing potential so as to tend to reduce the magnitude of said error signal potential substantially to zero, said selectively operable means being set so that said error signal potential for each change in the operation of said drive may rise to a maximum corresponding to the rated current of said motor, and means connected to said deriving means and to said selectively operable means for limiting the magnitude of said error signal potential to a predetermined magnitude.

5. A drive having the characteristics of short cycle timing and frequent reversals including a drive motor and means connected to said motor for supplying energizing potential thereto in dependence upon the desired operation of said motor, a regulator connected in regulating relationship to said supplying means and including means connected to said supplying means for deriving a first potential dependent on said energizing potential, selectively operable means for supplying a second potential dependent on the desired energizing potential, said selectively operable means being capable of being set so that said second potential instantaneously either aids or opposes said first potential depending on the desired change in the operation of said drive, and means responsive to an error signal potential dependent on the algebraic difference between said first and second potentials for causing said regulator to set said energizing potential so as to tend to reduce the magnitude of said error signal potential substantially to zero, said selectively operable means being set so that said error signal potential for each change in the operation of said drive may rise to a maximum corresponding to the rated current of said motor, and means connected to said deriving means and to said selectively operable means for limiting the magnitude of said third potential to a predetermined magnitude.

References Cited in the file of this patent
UNITED STATES PATENTS

| 2,504,105 | Bendz | Apr. 18, 1950 |
| 2,743,404 | Storey et al. | Apr. 24, 1956 |

FOREIGN PATENTS

| 653,444 | Great Britain | May 16, 1951 |